May 1, 1923.
M. D. KIMBALL
NUT LOCK
Filed June 21, 1922
1,453,507
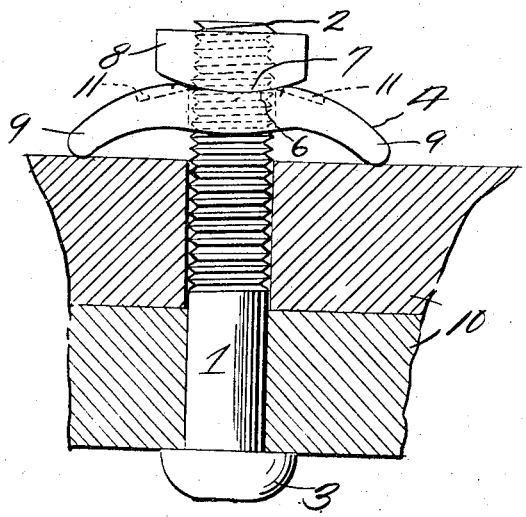
Fig. 1.
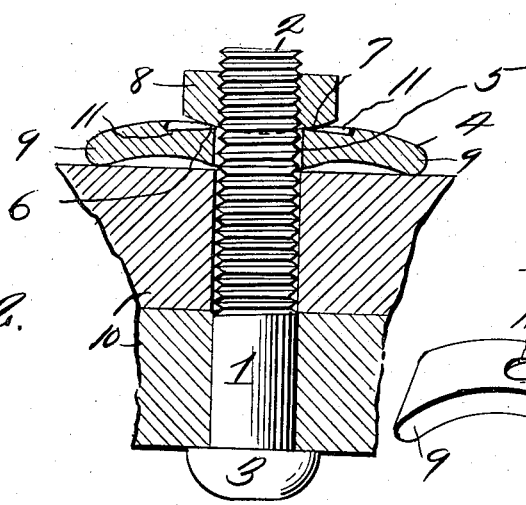
Fig. 2.
Fig. 4.
Fig. 3.
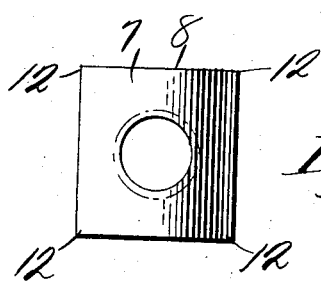
Fig. 5.
INVENTOR.
M. D. Kimball
BY
Philip A. H. Ferrell
ATTORNEY.

Patented May 1, 1923.

1,453,507

UNITED STATES PATENT OFFICE.

MATTHEW D. KIMBALL, OF OMAHA, NEBRASKA, ASSIGNOR OF ONE-HALF TO DAVID P. FEDER, OF OMAHA, NEBRASKA.

NUT LOCK.

Application filed June 21, 1922. Serial No. 569,984.

*To all whom it may concern:*

Be it known that MATTHEW D. KIMBALL, a citizen of the United States, residing at Omaha, in the county of Douglas and State of Nebraska, has invented certain new and useful Improvements in Nut Locks, of which the following is a specification.

The invention relates to nut locks and has for its object to provide a device of this character wherein a spring washer is utilized which washer is provided with a transversely disposed concavity adapted to receive a transversely disposed concaved side of the nut and hold said nut against accidental retrograde movement, incident to vibration or other causes.

A further object is to provide the outer face of the washer adjacent the sides of the concavity thereof with depressions, which depressions receive the diagonal corners of the nut upon an intermediate position of the nut such for instance as quarter turn of the nut, from its locked position.

A further object is to provide a lock nut which will not become loose under vibrations or other causes, which nut may be easily and quickly removed from a bolt and from the washer without damage thereto, thereby allowing the nut and washer to be used again.

With the above and other objects in view the invention resides in the combination and arrangement of parts as hereinafter set forth shown in the drawing, described and claimed, it being understood that changes in the precise embodiment of the invention may be made within the scope of what is claimed without departing from the spirit of the invention.

In the drawing:

Figure 1 is a side elevation of the bolt showing the nut and washer applied thereto and the nut and washer in condition to be tightened.

Figure 2 is a view in section showing the nut and washer tightened.

Figure 3 is a side elevation of the nut.

Figure 4 is a perspective view of the spring washer.

Figure 5 is a bottom plan view of the nut.

Referring to the drawing the numeral 1 designates a conventional form of bolt and 2 the threaded shank thereof, said bolt being provided with a head 3. Disposed on threaded shank 2 of the bolt is a spring washer 4, which washer is provided with a centrally disposed aperture 5 through which the bolt shank 2 passes. The washer 4, centrally thereof is provided with a transversely disposed concavity 6, which concavity is engaged by the transversely disposed convexed side 7 of the nut 8, therefore it will be seen that as the nut 8 is rotated, and when the convexed side 7 is in registration with the concavity 6 that the nut will be held against retrograde movement by the spring action of the upwardly, outwardly and downwardly curved ends 9 of the washer 4. It will be seen that when the ends of the washer engage for instance members 10 after being clamped together, the nut 8 cannot unscrew from the shank 2 unless a wrench is applied thereto and considerable power applied to the wrench. However it will be seen that when considerable power is applied to the nut 8, it may be unscrewed and again used, however the nut cannot unscrew under ordinary vibrations and from accidental reasons which are common in conventional forms of bolts and nuts.

The outer face of the washer 4 adjacent the sides of the concavity 6 is provided with depressions 11, which depressions receive the corners 12 of the nut when the nut is not in exact transverse position as shown in figure 1. For instance if the nut is turned one quarter turn the corners 12 will be received in the depressions 11 of the spring washer and the nut held against retrograde movement.

From the above it will be seen that a locking device is provided for nuts, which is simple in construction, may be unscrewed if so desired without injury to the nut and one which may be cheaply constructed.

The invention having been set forth what is claimed as new and useful is:—

1. The combination with the threaded shank of a bolt, a nut threaded on said threaded shank, of means for preventing retrograde movement of said nut after the same has been tightened, said means comprising a spring washer, said spring washer being provided with a transversely disposed concavity, the inner side of said nut being provided with a transversely disposed convexed surface adapted to be received in the concavity, the ends of said washer curving outwardly, upwardly and downwardly and adapted to engage a surface whereby said washer will be flexed.

2. A lock nut comprising a nut having a transversely disposed convexed side, said nut being threaded on the shank of the bolt, a spring washer carried by said shank, said spring washer being provided with a transversely disposed concavity adapted to receive the convexed side of the nut, the ends of said washer extending outwardly, upwardly and downwardly and adapted to engage an object for flexing the washer when the nut is tightened.

3. The combination with a spring washer and lock nut, said lock nut being provided with a transversely disposed convexed side cooperating with a tranversely disposed concavity in the washer, of means for holding said nut against retrograde movement upon a quarter turn of the nut, said means comprising depressions in the washer adjacent the opposite sides of the concavity therein.

In testimony whereof I affix my signature.

MATTHEW D. KIMBALL.